United States Patent
Shetty et al.

(10) Patent No.: US 10,021,604 B2
(45) Date of Patent: Jul. 10, 2018

(54) RADIO NETWORK CONTROLLER AND METHOD THEREIN FOR HANDING OVER A USER EQUIPMENT FROM UTRAN TO E-UTRAN

(71) Applicant: Telefonaktiebolaget LM Ericsson (publ), Stockholm (SE)

(72) Inventors: Manoj Shetty, Mumbai (IN); Debasish Sarkar, Frisco, TX (US); Ayan Sen, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/324,591

(22) PCT Filed: Jul. 9, 2014

(86) PCT No.: PCT/SE2014/050878
§ 371 (c)(1),
(2) Date: Jan. 6, 2017

(87) PCT Pub. No.: WO2016/007054
PCT Pub. Date: Jan. 14, 2016

(65) Prior Publication Data
US 2017/0208509 A1 Jul. 20, 2017

(51) Int. Cl.
*H04W 36/00* (2009.01)
*H04W 36/24* (2009.01)
*H04W 8/24* (2009.01)

(52) U.S. Cl.
CPC ... *H04W 36/0022* (2013.01); *H04W 36/0083* (2013.01); *H04W 36/24* (2013.01); *H04W 8/245* (2013.01)

(58) Field of Classification Search
CPC ..... H04W 36/00; H04W 36/30; H04W 88/08; H04W 36/0022; H04W 36/0083; H04W 36/24
USPC .......................... 455/436, 439, 561; 370/331
See application file for complete search history.

(56) References Cited

U.S. PATENT DOCUMENTS

| 8,374,610 | B2 * | 2/2013 | Hole | H04W 36/0055 |
|  |  |  |  | 455/436 |
| 8,755,329 | B2 * | 6/2014 | Faccin | H04W 48/18 |
|  |  |  |  | 370/328 |
| 9,253,794 | B2 * | 2/2016 | Manssour | H04W 72/1252 |
| 9,661,543 | B2 * | 5/2017 | Hole | H04W 36/165 |

(Continued)

FOREIGN PATENT DOCUMENTS

EP 2750454 A2 7/2014
WO 2013184300 A1 12/2013

*Primary Examiner* — Danh Le
(74) *Attorney, Agent, or Firm* — Murphy, Bilak & Homiller, PLLC

(57) ABSTRACT

A Radio Network Controller, RNC, and a method performed by the RNC for handing over a UE from a Universal Terrestrial Radio Access Network, UTRAN, to an Evolved UTRAN, E-UTRAN, wherein the UE has an ongoing Circuit Switched, CS, call and an ongoing Packet Switched, PS, session by means of the UTRAN are provided. The method comprises, when the CS call is released: determining (120) at least one criterion relating to at least one of an RNC characteristic, a UTRAN characteristic and an E-UTRAN characteristic; and handing over (130) the UE to the E-UTRAN when the at least one criterion is fulfilled.

15 Claims, 8 Drawing Sheets

(56) References Cited

U.S. PATENT DOCUMENTS

| | | | |
|---|---|---|---|
| 2010/0220680 A1* | 9/2010 | Ramankutty | H04W 68/08 370/329 |
| 2011/0164564 A1* | 7/2011 | Vedrine | H04W 36/0033 370/328 |
| 2012/0063414 A1* | 3/2012 | Ramachandran | H04W 36/0022 370/331 |
| 2013/0203452 A1* | 8/2013 | Awoniyi | H04W 52/0203 455/500 |
| 2014/0087723 A1 | 3/2014 | Cili et al. | |
| 2014/0198659 A1* | 7/2014 | Vargas Bautista | H04W 28/08 370/236 |

* cited by examiner

RADIO NETWORK CONTROLLER AND METHOD THEREIN FOR HANDING OVER A USER EQUIPMENT FROM UTRAN TO E-UTRAN

TECHNICAL FIELD

The present disclosure relates to wireless communication and in particular to handover of a User Equipment, UE, from Universal Terrestrial Radio Access Network, UTRAN, to Evolved UTRAN, E-UTRAN.

BACKGROUND

The number of users in wireless communication networks is constantly increasing. Also the number of different services being offered by the various wireless communication networks is constantly increasing. In order to cope with increasing demand on e.g. capacity and speed of the networks, different technologies and so called generations of the wireless communication networks have been developed. Today, it is relatively common to have several generations of wireless communication networks overlapping and operating simultaneously. For example, there may be a 2G communication network such as Global System for Mobile communication, GSM, and a 3G communication network such as Universal Mobile Telecommunications System, UMTS, together with a 4G communication network such as Long Term Evolution, LTE, more or less overlapping. Many wireless devices, hereinafter referred to as UEs, such as e.g. mobile telephones, laptops, personal digital assistants, and other devices having means for communicating wirelessly with a wireless communication network, may be operated on some or all of the above mentioned wireless communication networks, 2G, 3G and 4G.

The different wireless networks are more or less suitable for different services being offered by the wireless communication networks. Merely as an example, 2G is most suitable for speech calls, whereas 3G is suitable both for speech calls and data transfer and 4G having a much higher bitrate is even more suitable than 3G for transferring data. Thus, a UE may be handed over between the different communication networks both with regard to which wireless communication networks are available and with regard to which service(s) the UE is engaged in.

Since the different wireless communication networks, 2G, 3G and 4G, are based on different technologies, several problems may arise when a UE is to be handed over from one network, e.g. a 3G network, to another network, e.g. a 4G network.

SUMMARY

The object is to obviate at least some of the problems outlined above. In particular, it is an object to provide a Radio Network Controller, RNC, and a method performed by the RNC for handing over a UE from a Universal Terrestrial Radio Access Network, UTRAN, to an Evolved UTRAN, E-UTRAN, wherein the UE has an ongoing Circuit Switched, CS, call and an ongoing Packet Switched, PS, session by means of the UTRAN. It is further an object to provide a Self Optimising Network-Optimisation Manager, SON-OM, and a method performed by the SON-OM, for determining a load level of an E-UTRAN. These objects and others may be obtained by providing a RNC and a SON-OM and a respective method by the RNC and the SON-OM according to the independent claims attached below.

According to an aspect a method performed by an RNC for handing over a UE from a UTRAN to an E-UTRAN, wherein the UE has an ongoing CS call and an ongoing PS session by means of the UTRAN is provided. The method comprises, when the CS call is released: determining at least one criterion relating to at least one of an RNC characteristic, a UTRAN characteristic and an E-UTRAN characteristic; and handing over the UE to the E-UTRAN when the at least one criterion is fulfilled.

According to an aspect, a method performed by a SON-OM for determining a load level of an E-UTRAN is provided. The method comprises determining a current subscription ratio of the E-UTRAN and transmitting the load level of the E-UTRAN to an RNC.

According to an aspect an RNC adapted for handing over a UE from a UTRAN to an E-UTRAN, wherein the UE has an ongoing CS call and an ongoing PS session by means of the UTRAN is provided. The RNC comprises a processor and memory, the memory comprising instructions, e.g. by means of a computer program, which when executed by the processor causes the RNC to, when the CS call is released: determine at least one criterion relating to at least one of an RNC characteristic, a UTRAN characteristic and an E-UTRAN characteristic; and to hand over the UE to the E-UTRAN when the at least one criterion is fulfilled.

According to an aspect, a SON-OM adapted for determining a load level of an E-UTRAN is provided. The SON-OM comprises a processor and memory, the memory comprising instructions, e.g. by means of a computer program, which when executed by the processor causes the SON-OM to determine a current subscription ratio of the E-UTRAN and to transmit the load level of the E-UTRAN to an RNC.

According to an aspect an RNC for handing over a UE from a UTRAN to an E-UTRAN, wherein the UE has an ongoing CS call and an ongoing PS session by means of the UTRAN is provided. The RNC comprises a determining unit for determining at least one criterion relating to at least one of an RNC characteristic, a UTRAN characteristic and an E-UTRAN characteristic, when the CS call is released; and a handover unit for handing over the UE to the E-UTRAN when the at least one criterion is fulfilled.

According to an aspect, a SON-OM for determining a load level of an E-UTRAN is provided. The SON-OM comprises a determining unit for determining a current subscription ratio of the E-UTRAN and a transmitting unit for transmitting the load level of the E-UTRAN to an RNC.

The RNC and the method performed by the RNC may have several possible advantages. One possible advantage is that decision to hand over the UE to E-UTRAN is taken based on current circumstances and not just blindly once the CS call is released. Resources of UTRAN and E-UTRAN may be more efficiently used depending on their respective current load or resource usage. User experience may be improved since a UE may be kept in or handed over to the Radio Access Network having lowest load or resource usage, thereby avoiding a possible overload of either of the UTRAN and the E-UTRAN.

The SON-OM and the method performed by the SON-OM may have several possible advantages. One possible advantage is that it enables the RNC to obtain information about the current load situation of the E-UTRAN and hence make a decision about handing over the UE from UTRAN to E-UTRAN or keeping the UE in the UTRAN at least partly based on the information relating to the load of the E-UTRAN. Thus the method performed by the SON-OM also have the possible advantage of enabling decision to hand over the UE to E-UTRAN to be taken based on current circumstances and not just blindly once the CS call is released. Resources of UTRAN and E-UTRAN may be more efficiently used depending on their respective current load or resource usage. User experience may be improved since a UE may be kept in or handed over to the Radio Access Network having lowest load or resource usage, thereby avoiding a possible overload of either of the UTRAN and the E-UTRAN.

BRIEF DESCRIPTION OF DRAWINGS

Embodiments will now be described in more detail in relation to the accompanying drawings, in which.

DETAILED DESCRIPTION

Briefly described, a Radio Network Controller, RNC, and a method performed thereby for handing over a User Equipment, UE, from a Universal Terrestrial Radio Access Network, UTRAN, to an Evolved UTRAN, E-UTRAN, wherein the UE has an ongoing Circuit Switched, CS, call and an ongoing Packet Switched, PS, session by means of the UTRAN are provided. Further, a Self Optimising Network-Optimisation Manager, SON-OM, and a method performed by the SON-OM for determining a load level of the E-UTRAN are provided. The RNC determines whether to hand over the UE to the E-UTRAN or to keep serving the UE by means of the UTRAN when the CS call is released. Depending on at least one criterion relating to at least one of an RNC characteristic, a UTRAN characteristic and an E-UTRAN characteristic, the RNC makes this decision.

If a UE is active Packet Switched, PS, data session on LTE and it performs Circuit Switched Fall Back, CSFB, the CS session is initiated on UTRAN and PS session is transferred to UTRAN. However, after the CS call is released, the data session still continues on 3G. There may be separate triggers available to initiate a PS Data Session end followed by Release with Redirect, RWR, mechanism allowing the UE to return to LTE.

Exemplifying embodiment of a method performed by an RNC for handing over a UE from a UTRAN to an E-UTRAN, wherein the UE has an ongoing CS, call and an ongoing PS session by means of the UTRAN will now be described with reference to FIG. 1a and FIG. 1b.

Figure 1A:
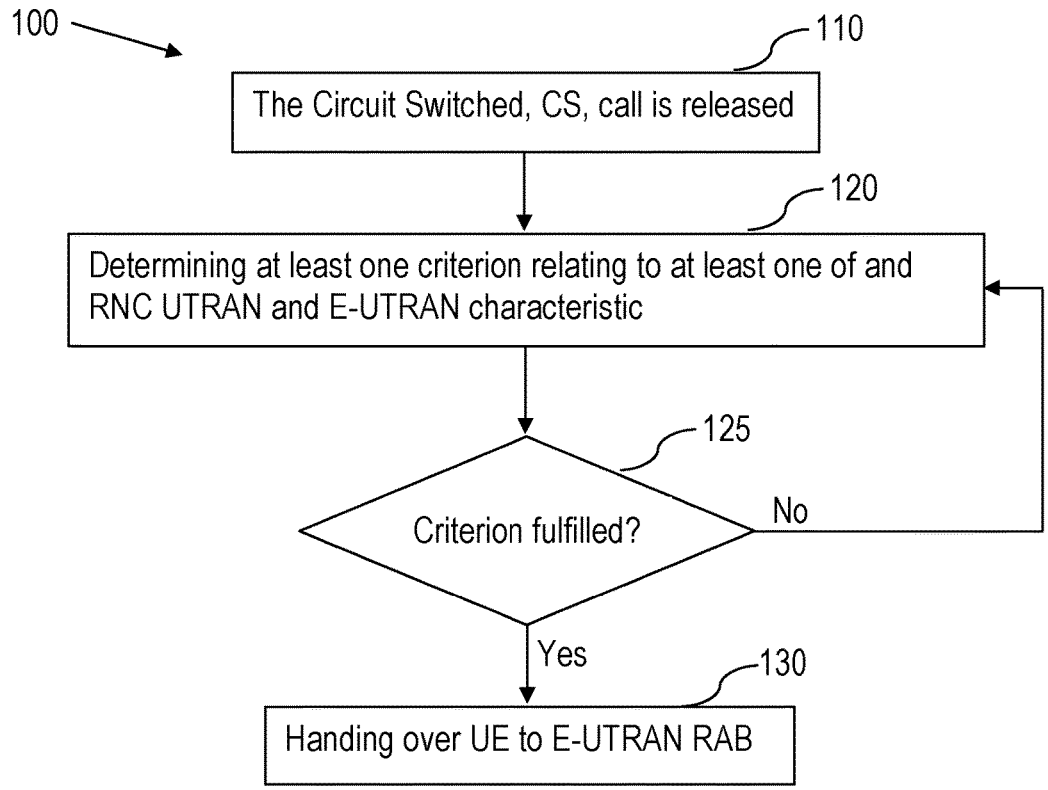
FIG. 1a is a flowchart of a method performed by a Radio network Controller, RNC, for handing over a UE from a UTRAN to an E-UTRAN, according to an exemplifying embodiment.

FIG. 1a illustrates the method comprising, when the CS call is released: determining 120 at least one criterion relating to at least one of an RNC characteristic, a UTRAN characteristic and an E-UTRAN characteristic; and handing over 130 the UE to the E-UTRAN when the at least one criterion is fulfilled.

The UE ends its CS call, which means that the CS call is released. Since the US still has its PS session ongoing by means of the UTRAN, the RNC evaluates whether to keep the UE served by means of the UTRAN, i.e. keep the PS session being performed over UTRAN, or to hand over the UE to E-UTRAN, i.e. switch the PS session to E-UTRAN. Since E-UTRAN generally provides much higher bitrate than UTRAN, the user of the UE may experience an improved quality of service if E-UTRAN is used to provide the PS session instead of UTRAN, granted there are enough resources available on E-UTRAN. However, there may be different reasons for keeping the PS session over UTRAN and/or for handing over the UE to E-UTRAN and thus handle the PS session over E-UTRAN. The different reasons will be explained in more detail below, but briefly the E-UTRAN may be much heavier loaded than the UTRAN or vice versa, which may be a reason for either keeping the UE being served by UTRAN or for handing over the UE, i.e. the PS session, to E-UTRAN.

Once the RNC has determined 120 which at least one criterion relating to at least one of an RNC characteristic, a UTRAN characteristic and an E-UTRAN characteristic to evaluate, the RNC evaluates the criterion to see whether it is fulfilled or not, e.g. by determining if a current characteristic is equal to, below or above a threshold with regards to the criterion. Thus, once the criterion is fulfilled, the RNC hands over 130 the UE to the E-UTRAN.

Merely as a simplified example, if the criterion is a load level (or level or resource usage) of the E-UTRAN, then the RNC may e.g. hand over the UE to E-UTRAN once the load level falls below a threshold value.

It shall be pointed out that the PS session may have started on E-UTRAN, wherein the RNC has performed a Circuit Switched Fall Back, CSFB, handover to UTRAN when the CS call is to be established.

Alternatively, the PS session may have started on UTRAN, e.g. due to lack of resources at the time of setup of the PS session, or lack of radio coverage with regards to E-UTRAN and only UTRAN was available. Thus, when the CS call is released, the load situation of the E-UTRAN may have changed, or the UE may have roamed into an area where E-UTRAN radio coverage is present.

The method performed by the RNC may have several possible advantages. One possible advantage is that decision to hand over the UE to E-UTRAN is taken based on current circumstances and not just blindly once the CS call is released. Resources of UTRAN and E-UTRAN may be more efficiently used depending on their respective current load or resource usage. User experience may be improved since a UE may be kept in or handed over to the Radio Access Network having lowest load or resource usage, thereby avoiding a possible overload of either of the UTRAN and the E-UTRAN.

The at least one criterion may relate to the RNC characteristic, wherein the criterion is amount of pending Radio Link Control, RLC, buffer data within the RNC for downlink transmission, the pending RLC buffer data being associated with the UE.

The RNC may have a plurality of different buffers, e.g. an RLC buffer. Each UE being served by means of the RNC may have a separate RLC buffer in the RNC. Thus the RLC buffer comprises pending RLC buffer data associated with the UE. Consequently, the RLC buffer for the UE may comprise a relatively large amount data or relatively small amount of pending RLC buffer data to be transmitted to the UE. Depending on whether the RLC buffer comprises a relatively large amount data or relatively small amount of pending RLC buffer data to be transmitted to the UE, the RNC may decide either to keep the UE (and thus the PS session) being served by means of UTRAN or to hand over the UE to E-UTRAN.

Figure 1B:
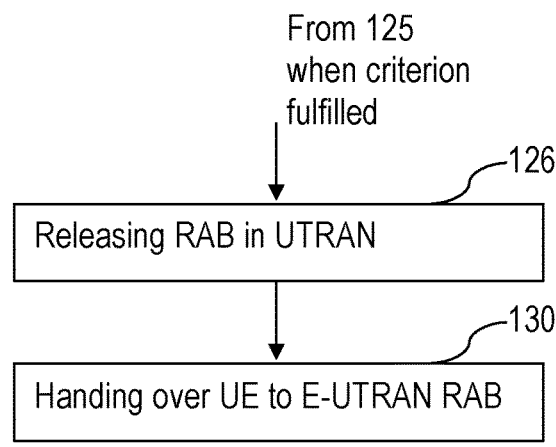
FIG. 1b is a flowchart of a method performed by an RNC for handing over a UE from a UTRAN to an E-UTRAN, according to yet an exemplifying embodiment.

According to an example, illustrated in FIG. 1b, the amount of pending RLC buffer data is compared against a threshold, wherein the method comprises releasing 126 a Radio Access Bearer, RAB in the UTRAN and handing over 130 the UE to the E-UTRAN-RAB if the amount of data pending in the RLC buffer arrangement is above the threshold.

As described above, the amount of pending RLC buffer data may be relatively large or relatively small. If the amount of pending RLC buffer data is relatively large, then it may take much longer to transmit the data to the UE by means of UTRAN compared to transmitting the data by means of E-UTRAN. Consequently, if the amount of pending RLC buffer data is above the threshold, indicating that there is a relatively large amount of data, the RNC releases 126 the RAB in UTRAN and hands over the UE to a RAB in E-UTRAN. In this manner, the data to be transmitted to the UE may be transmitted over E-UTRAN which will probably take less time than keeping the UE being served by means of UTRAN, which may lead to an improved experienced quality of service of a user of the UE.

However, if the amount of pending RLC buffer data is relatively small, thus being below the threshold, there may not be much data to send, and thus there may be little gain, with regards to time, by handing over the UE to E-UTRAN. Consequently, the RNC may keep the UE being served by UTRAN in order to transmit the relatively small amount of pending RLC buffer data to the UE.

The at least one criterion may relate to the UTRAN characteristic, wherein the criterion is a load level of the UTRAN.

As briefly described above, the UTRAN may be more or less heavily loaded. There may be several ways to define the load of the UTRAN. One possible example is a ratio between the amount of available radio resources compared to a total of offered radio resources. Another example of defining the load of the UTRAN is by means of determining an interference situation in the UTRAN, for example Signal to Interference and Noise Ratio, SINR, in the UTRAN. A third example of UTRAN loading can be the number of connected High Speed Downlink Shared Channel HS-DSCH users on available High Speed Downlink Packet Data Access HSDPA services on the DL. Still an example is by means of determining a usage level of buffers in the RNC, the buffers being associated with UTRAN.

If the load level of UTRAN is relatively high, then it might be disadvantageous to keep the UE being served by UTRAN, and thus it might be preferable to hand over the UE to E-UTRAN in order to offload UTRAN.

The load level of the UTRAN may be determined by at least one of downlink transmitted carrier power, downlink channelization code usage, downlink Channel Element, CE, usage, number of High Speed Downlink Packet Access users, and uplink Received Total Wideband Power, RTWP.

These are other examples of how to determine the load of UTRAN. Transmitted carrier power is the total transmitted power on one carrier from one UTRAN access point. Measurement may be performed on any carrier transmitted from the UTRAN access point.

CE resources are a type of NodeB hardware resource. The number of CEs supported by single NodeB indicates the channel demodulation capabilities resource of the NodeB. CE resources are managed by both the RNC and NodeB. The NodeB reports its CE capacity to the RNC. Thus, a high usage of CEs indicates that the UTRAN may be highly loaded.

RTWP is related to uplink interference and it provides information for congestion control regarding uplink interference.

The at least one criterion may relate to the E-UTRAN characteristic, wherein the criterion is a load level of the E-UTRAN.

The load level of the E-UTRAN may be a criterion. In case the E-UTRAN is heavily loaded, it might be disadvantageous to hand over the UE to E-UTRAN so instead the RNC may decide to keep the UE being served by UTRAN. On the other hand, if the E-UTRAN is experience a relatively low load, then it might be beneficial to hand over the UE to E-UTRAN.

The load level of the E-UTRAN may be received from a Self Optimising Network-Optimisation Manager, SON-OM.

There are different ways of determining the load level of the E-UTRAN. In one example, the SON-OM determines the load level of the E-UTRAN and transmits this information to the RNC. Thus the RNC receives the information regarding the load level of the E-UTRAN from the SON-OM.

According to an embodiment, at least two of the above described criterions have to be fulfilled for the RNC to hand over the UE from UTRAN to E-UTRAN.

According to a further embodiment, the method further comprises determining a criterion relating to an E-UTRAN characteristic and at least one criterion of an RNC characteristic and a UTRAN characteristic, wherein the E-UTRAN characteristic is a load level of the E-UTRAN, and handing over the UE to the E-UTRAN when the load level of the E-UTRAN is below a threshold and the at least one criterion relating to the RNC characteristic and the UTRAN characteristic is fulfilled.

In this embodiment, the load level of the E-UTRAN must be below the threshold first. This means that in case the E-UTRAN experience a relatively high load, it may be disadvantageous to hand over to UE to E-UTRAN and thereby increasing the load of E-UTRAN. In other words, if the load level of the E-UTRAN is above the threshold, the UE is kept being served by UTRAN.

If the load level of the E-UTRAN on the other hand is below the threshold, at least one of the other criterions needs to be fulfilled before the UE is handed over to E-UTRAN.

Those other criterions may relate to, as described above o the RNC characteristic (e.g. the amount of pending RLC buffer data within the RNC for downlink transmission) and the UTRAN characteristic (e.g. load level of the UTRAN).

Embodiment herein also relate to a method performed by a SON-OM for determining a load level of an E-UTRAN. Embodiments of such a method will now be described with reference to FIG. 2.

Figure 2:
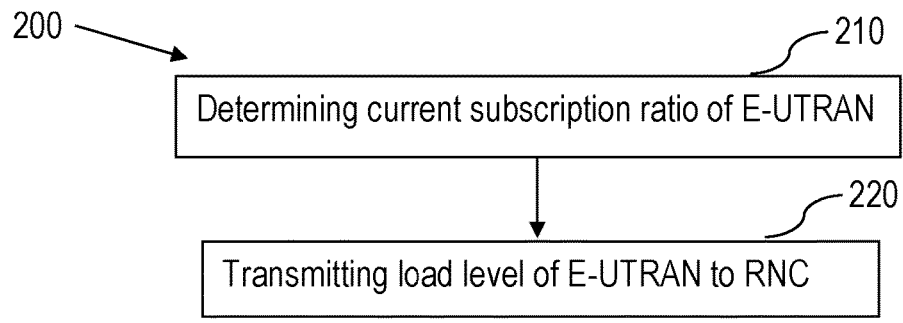
FIG. 2 is a flowchart of a method performed by a Self Optimising Network-Optimisation Manager, SON-OM, for determining a load level of an E-UTRAN, according to an exemplifying embodiment.

FIG. 2 illustrates the method 200 comprising determining 210 a current subscription ratio of the E-UTRAN and transmitting 220 the load level of the E-UTRAN to an RNC.

The SON-OM may have access to different types of information. One example is the current subscription ratio of the E-UTRAN. This may serve as an indication of the load level of E-UTRAN and is thus determined by the SON-OM and then transmitted to the E-UTRAN.

The SON-OM may use a UtranCellRelation Managed Object, MO, of all the eNodeBs and create a list of definition of 3G Cells. This list will be associated with the UtranCellRelation MO so that any WCDMA IRAT Neighbour when added will automatically get updated in a table. The SON-OM may calculate and maintain the LTE Subscription Ratio for all the eNodeBs in the system and associate it with the WCDMA-LTE cell neighbour table. The SON-OM will calculate the LTE Subscription ratio for all the LTE cells at a fixed periodicity and update the table.

This information may be provided to the RNC via an interface at a regular interval so that the RNC has updated information about the current LTE load. Based on this information, whenever the criteria for RWR are to be evaluated, the RNC may check from this table for the source UTRAN cell (NodeB) if the Subscription Ratio of the target LTE Radio Access Network, LRAN, cells is below a certain threshold. If one or more LRAN cells satisfy the criteria, it may be flagged as a go ahead criteria for pre-empting the existing PS RAB and proceed with RWR.

The method performed by the SON-OM may have several possible advantages. One possible advantage is that it enables the RNC to obtain information about the current load situation of the E-UTRAN and hence make a decision about handing over the UE from UTRAN to E-UTRAN or keeping the UE in the UTRAN at least partly based on the information relating to the load of the E-UTRAN. Thus the method performed by the SON-OM also have the possible advantage of enabling decision to hand over the UE to E-UTRAN to be taken based on current circumstances and not just blindly once the CS call is released. Resources of UTRAN and E-UTRAN may be more efficiently used depending on their respective current load or resource usage. User experience may be improved since a UE may be kept in or handed over to the Radio Access Network having lowest load or resource usage, thereby avoiding a possible overload of either of the UTRAN and the E-UTRAN.

Embodiments herein also relate to an RNC adapted for handing over a UE from a UTRAN, to an E-UTRAN, wherein the UE has an ongoing CS, call and an ongoing PS session by means of the UTRAN. Exemplifying embodiments of the RNC will now be described with reference to FIG. 3. The RNC has the same technical features, objects and advantages as the method performed by the RNC. The RNC will thus only be described in brief in order to avoid unnecessary repetition.

Figure 3:
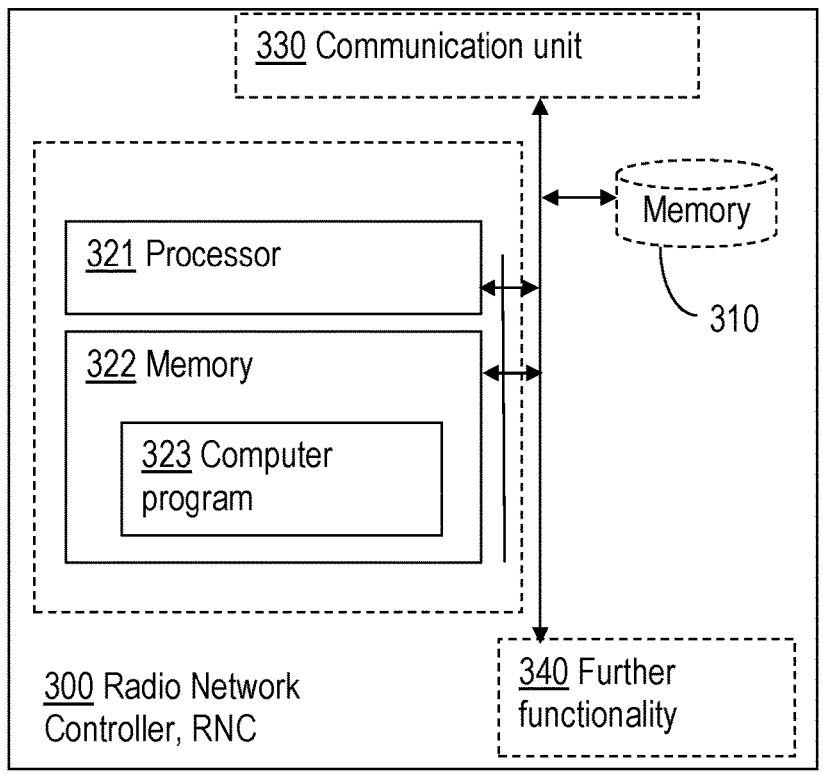
FIG. 3 is a block diagram of an RNC adapted for handing over a UE from a UTRAN to an E-UTRAN, according to an exemplifying embodiment.

FIG. 3 illustrates the RNC 300 comprising a processor 321 and memory 322, the memory comprising instructions, e.g. by means of a computer program 323, which when executed by the processor 321 causes the RNC 300 to, when the CS call is released: determine at least one criterion relating to at least one of an RNC characteristic, a UTRAN characteristic and an E-UTRAN characteristic; and to hand over the UE to the E-UTRAN when the at least one criterion is fulfilled.

The RNC may have the same possible advantages as the method performed by the RNC. One possible advantage is that decision to hand over the UE to E-UTRAN is taken based on current circumstances and not just blindly once the CS call is released. Resources of UTRAN and E-UTRAN may be more efficiently used depending on their respective current load or resource usage. User experience may be improved since a UE may be kept in or handed over to the Radio Access Network having lowest load or resource usage, thereby avoiding a possible overload of either of the UTRAN and the E-UTRAN.

The at least one criterion may relate to the RNC characteristic, wherein the criterion is amount of pending data in an RLC buffer within the RNC for downlink transmission, the pending RLC buffer data being associated with the UE.

In an example, the amount of data pending in the RLC buffer arrangement is compared against a threshold, wherein the memory 322 further comprises instructions, which when executed by the processor 321 causes the RNC 300 to release a RAB in the UTRAN and handing over the UE to the E-UTRAN-RAB if the amount of data pending in the RLC buffer arrangement is above the threshold.

The at least one criterion may relate to the UTRAN characteristic, wherein the criterion is a load level of the UTRAN.

The load level of the UTRAN may be determined by at least one of downlink transmitted carrier power, downlink channelization code usage, downlink Channel Element usage, number of High Speed Downlink Packet Access users, and uplink Received Total Wideband Power.

The at least one criterion may relate to the E-UTRAN characteristic, wherein the criterion is a load level of the E-UTRAN.

The load level of the E-UTRAN may be received from a SON-OM.

According to an embodiment, the memory 322 further comprises instructions, which when executed by the processor 321 causes the RNC 300 to determine a criterion relating to an E-UTRAN characteristic and at least one criterion of an RNC characteristic and a UTRAN characteristic, wherein the E-UTRAN characteristic is a load level of the E-UTRAN, and to hand over the UE to the E-UTRAN when the load level of the E-UTRAN is below a threshold and the at least one criterion relating to the RNC characteristic and the UTRAN characteristic is fulfilled.

Embodiments herein also relate to a SON-OM adapted for determining a load level of an E-UTRAN. The SON-OM has the same technical features, objects and advantages as the method performed by the SON-OM. The SON-OM will thus only be described in brief in order to avoid unnecessary repetition.

Figure 4:
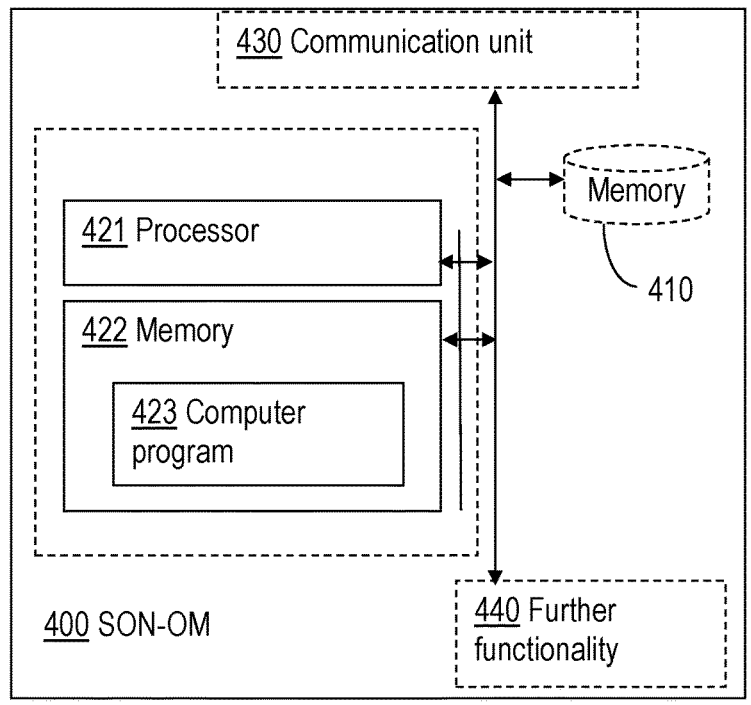
FIG. 4 is a block diagram of a SON-OM adapted for determining a load level of an E-UTRAN, according to an exemplifying embodiment.

FIG. 4 illustrates the SON-OM 400 comprising a processor 421 and memory 422, the memory comprising instructions, e.g. by means of a computer program 423, which when executed by the processor 421 causes the SON-OM 400 to determine a current subscription ratio of the E-UTRAN and to transmit the load level of the E-UTRAN to an RNC.

The SON-OM has the same possible advantages as the method performed by the SON-OM. One possible advantage is that it enables the RNC to obtain information about the current load situation of the E-UTRAN and hence make a decision about handing over the UE from UTRAN to E-UTRAN or keeping the UE in the UTRAN at least partly based on the information relating to the load of the E-UTRAN. Thus the method performed by the SON-OM also have the possible advantage of enabling decision to hand over the UE to E-UTRAN to be taken based on current circumstances and not just blindly once the CS call is released. Resources of UTRAN and E-UTRAN may be more efficiently used depending on their respective current load or resource usage. User experience may be improved since a UE may be kept in or handed over to the Radio Access Network having lowest load or resource usage, thereby avoiding a possible overload of either of the UTRAN and the E-UTRAN.

Embodiments herein also relate to an RNC for handing over a UE from a UTRAN, to an E-UTRAN, wherein the UE has an ongoing CS, call and an ongoing PS session by means of the UTRAN. Exemplifying embodiments of the RNC will now be described with reference to FIG. 5. The RNC has the same technical features, objects and advantages as the method performed by the RNC, and the RNC described above with reference to FIG. 3. The RNC will thus only be described in brief in order to avoid unnecessary repetition.

Figure 5:
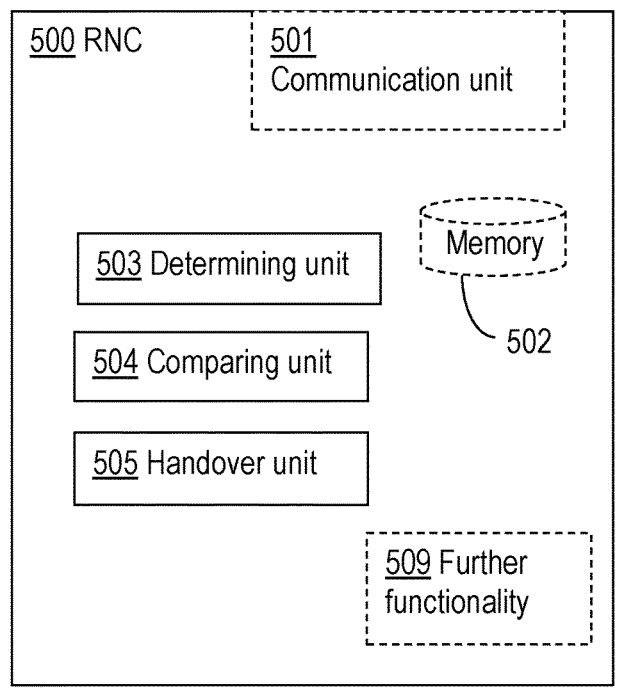
FIG. 5 is a block diagram of an RNC for handing over a UE from a UTRAN to an E-UTRAN, according to an exemplifying embodiment.

FIG. 5 illustrates the RNC 500 comprising a determining unit 503 for determining at least one criterion relating to at least one of an RNC characteristic, a UTRAN characteristic and an E-UTRAN characteristic, when the CS call is released; and a handover unit 505 for handing over the UE to the E-UTRAN when the at least one criterion is fulfilled.

The RNC may have the same possible advantages as the method performed by the RNC. One possible advantage is that decision to hand over the UE to E-UTRAN is taken based on current circumstances and not just blindly once the CS call is released. Resources of UTRAN and E-UTRAN may be more efficiently used depending on their respective current load or resource usage. User experience may be improved since a UE may be kept in or handed over to the Radio Access Network having lowest load or resource usage, thereby avoiding a possible overload of either of the UTRAN and the E-UTRAN.

Embodiment herein also relate to a SON-OM for determining a load level of an E-UTRAN. The SON-OM has the same technical features, objects and advantages as the method performed by the SON-OM, and the SON-OM described above with reference to FIG. 4. The SON-OM will thus only be described in brief in order to avoid unnecessary repetition.

Figure 6:
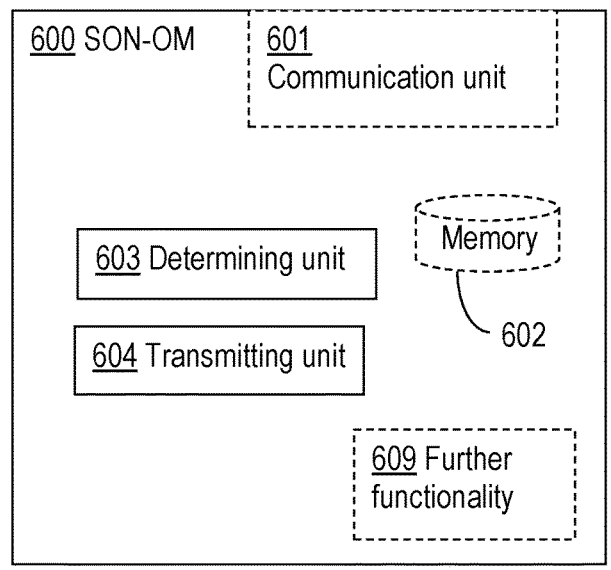
FIG. 6 is a block diagram of a SON-OM for determining a load level of an E-UTRAN, according to an exemplifying embodiment.

FIG. 6 illustrates the SON-OM 600 comprising a determining unit 603 for determining a current subscription ratio of the E-UTRAN and a transmitting unit 604 for transmitting the load level of the E-UTRAN to a Radio Network Controller, RNC.

The SON-OM has the same possible advantages as the method performed by the SON-OM. One possible advantage is that it enables the RNC to obtain information about the current load situation of the E-UTRAN and hence make a decision about handing over the UE from UTRAN to E-UTRAN or keeping the UE in the UTRAN at least partly based on the information relating to the load of the E-UTRAN. Thus the method performed by the SON-OM also have the possible advantage of enabling decision to hand over the UE to E-UTRAN to be taken based on current circumstances and not just blindly once the CS call is released. Resources of UTRAN and E-UTRAN may be more efficiently used depending on their respective current load or resource usage. User experience may be improved since a UE may be kept in or handed over to the Radio Access Network having lowest load or resource usage, thereby avoiding a possible overload of either of the UTRAN and the E-UTRAN.

In FIG. 5, the RNC 500 is also illustrated comprising a communication unit 501. Through this unit, the RNC 500 is adapted to communicate with other nodes and/or entities in the wireless communication network. The communication unit 501 may comprise more than one receiving arrangement. For example, the communication unit 501 may be connected to both a wire and an antenna, by means of which the RNC 500 is enabled to communicate with other nodes and/or entities in the wireless communication network. Similarly, the communication unit 501 may comprise more than one transmitting arrangement, which in turn are connected to both a wire and an antenna, by means of which the RNC 500 is enabled to communicate with other nodes and/or entities in the wireless communication network. The RNC 500 further comprises a memory 502 for storing data. Further, the RNC 500 may comprise a control or processing unit (not shown) which in turn is connected to the different units 503-505. It shall be pointed out that this is merely an illustrative example and the RNC 500 may comprise more, less or other units or modules which execute the functions of the RNC 500 in the same manner as the units illustrated in FIG. 5.

It should be noted that FIG. 5 merely illustrates various functional units in the RNC 500 in a logical sense. The functions in practice may be implemented using any suitable software and hardware means/circuits etc. Thus, the embodiments are generally not limited to the shown structures of the RNC 500 and the functional units. Hence, the previously described exemplary embodiments may be realised in many ways. For example, one embodiment includes a computer-readable medium having instructions stored thereon that are executable by the control or processing unit for executing the method steps in the RNC 500. The instructions executable by the computing system and stored on the computer-readable medium perform the method steps of the RNC 500 as set forth in the claims.

In FIG. 6, the SON-OM 600 is also illustrated comprising a communication unit 601. Through this unit, the SON-OM 600 is adapted to communicate with other nodes and/or entities in the wireless communication network. The communication unit 601 may comprise more than one receiving arrangement. For example, the communication unit may be connected to both a wire and an antenna, by means of which the SON-OM 600 is enabled to communicate with other nodes and/or entities in the wireless communication network. Similarly, the communication unit 601 may comprise more than one transmitting arrangement, which in turn are connected to both a wire and an antenna, by means of which the SON-OM 600 is enabled to communicate with other nodes and/or entities in the wireless communication network. The SON-OM 600 further comprises a memory 602 for storing data. Further, the SON-OM 600 may comprise a control or processing unit (not shown) which in turn is connected to the different units 603-604. It shall be pointed out that this is merely an illustrative example and the SON-OM 600 may comprise more, less or other units or modules which execute the functions of the SON-OM 600 in the same manner as the units illustrated in FIG. 6.

It should be noted that FIG. 6 merely illustrates various functional units in the SON-OM 600 in a logical sense. The functions in practice may be implemented using any suitable software and hardware means/circuits etc. Thus, the embodiments are generally not limited to the shown structures of the SON-OM 600 and the functional units. Hence, the previously described exemplary embodiments may be realised in many ways. For example, one embodiment includes a computer-readable medium having instructions stored thereon that are executable by the control or processing unit for executing the method steps in the SON-OM 600. The instructions executable by the computing system and stored on the computer-readable medium perform the method steps of the SON-OM 600 as set forth in the claims.

Figure 7:
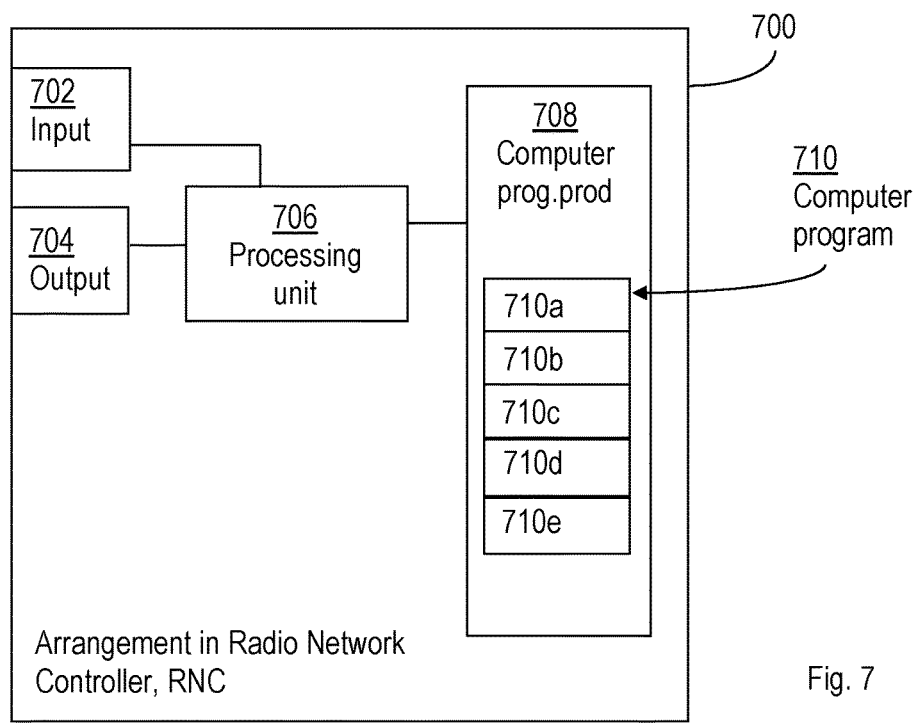
FIG. 7 is a block diagram of an arrangement in an RNC for handing over a UE from a UTRAN to an E-UTRAN, according to an exemplifying embodiment.

FIG. 7 schematically shows an embodiment of an arrangement in a RNC 700. Comprised in the arrangement in the RNC 700 are here a processing unit 706, e.g. with a Digital Signal Processor, DSP. The processing unit 706 may be a single unit or a plurality of units to perform different actions of procedures described herein. The RNC 700 may also comprise an input unit 702 for receiving signals from other entities, and an output unit 704 for providing signal(s) to other entities. The input unit and the output unit may be arranged as an integrated entity or as illustrated in the example of FIG. 5, as one or more interfaces 501.

Furthermore, the RNC 700 comprises at least one computer program product 708 in the form of a non-volatile memory, e.g. an Electrically Erasable Programmable Read-Only Memory, EEPROM, a flash memory and a hard drive. The computer program product 708 comprises a computer program 710, which comprises code means, which when executed in the processing unit 706 in the arrangement in the RNC 700 causes the RNC to perform the actions e.g. of the procedure described earlier in conjunction with FIGS. 1a and 1b.

The computer program 710 may be configured as a computer program code structured in computer program modules 710a-710e. Hence, in an exemplifying embodiment, the code means in the computer program of the RNC 700 comprises a determining unit, or module, for determining at least one criterion relating to at least one of an RNC characteristic, a UTRAN characteristic and an E-UTRAN characteristic. The computer program further comprises a handover unit, or module, for handing over the UE to the E-UTRAN when the at least one criterion is fulfilled.

The computer program modules could essentially perform the actions of the flow illustrated in FIG. 1a, to emulate the RNC 500. In other words, when the different computer program modules are executed in the processing unit 706, they may correspond to the units 503-505 of FIG. 5.

Figure 8:
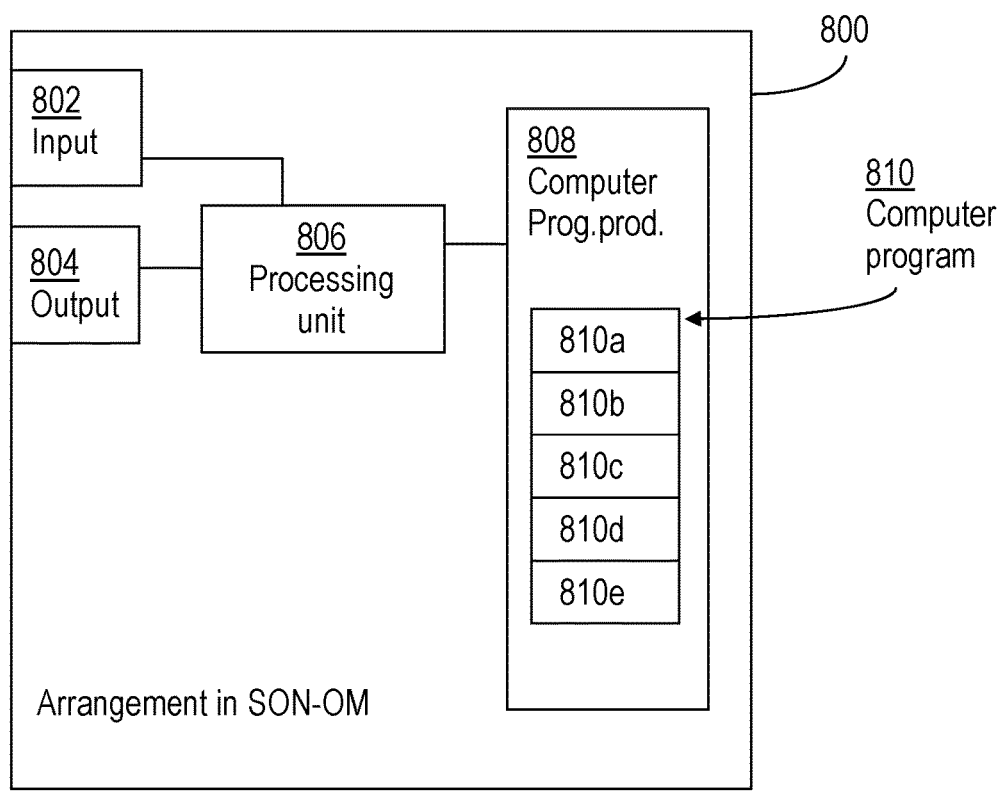
FIG. 8 is a block diagram of an arrangement in a SON-OM for determining a load level of an E-UTRAN, according to an exemplifying embodiment.

FIG. 8 schematically shows an embodiment of a SON-OM 800. Comprised in the SON-OM 800 are here a processing unit 806, e.g. with a Digital Signal Processor. The processing unit 806 may be a single unit or a plurality of units to perform different actions of procedures described herein. The SON-OM 800 may also comprise an input unit 802 for receiving signals from other entities, and an output unit 804 for providing signal(s) to other entities. The input unit and the output unit may be arranged as an integrated entity or as illustrated in the example of FIG. 6, as one or more interfaces 601.

Furthermore, the SON-OM 800 comprises at least one computer program product 808 in the form of a non-volatile memory, e.g. an Electrically Erasable Programmable Read-Only Memory, EEPROM, a flash memory and a hard drive. The computer program product 808 comprises a computer program 810, which comprises code means, which when executed in the processing unit 806 in the SON-OM 800 causes the SON-OM 800 to perform the actions e.g. of the procedure described earlier in conjunction with FIG. 2.

The computer program 810 may be configured as a computer program code structured in computer program modules 810a-810e. Hence, in an exemplifying embodiment, the code means in the computer program of the SON-OM 800 comprises a determining unit, or module, for determining a current subscription ratio of the E-UTRAN. The computer program further comprises a transmitting unit, or module, for transmitting the load level of the E-UTRAN to an RNC.

The computer program modules could essentially perform the actions of the flow illustrated in FIG. 2, to emulate the SON-OM 600. In other words, when the different computer program modules are executed in the processing unit 806, they may correspond to the units 603-604 of FIG. 6.

Although the code means in the respective embodiments disclosed above in conjunction with FIGS. 5 and 6 are implemented as computer program modules which when executed in the respective processing unit causes the RNC and the SON-OM respectively to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the RNC and the SON-OM respectively.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

When a LTE UE is performing active data session on LTE network and it needs to perform a voice call (Mobile originated or Mobile Terminated) in a non IP Multimedia Subsystem, IMS, type environment, then this is achieved by a procedure called CSFB as described below. After the voice call (CS Bearer) is setup on the UTRAN, the procedure for data session is initiated and after successful handover of the data session to UTRAN, the CS voice call and PS data session are continued on UTRAN.

The call flow for CSFB with PS session handover may be as follows. The UE sends an Extended Service Request (CS Fallback Indicator) to the MME. CS Fallback Indicator indicates Mobility Management Entity, MME, to perform CS Fallback. The MME sends an S1-AP UE Context Modification Request message to eNB that includes a CS Fallback Indicator. This message indicates to the eNB that the UE should be moved to UTRAN/GERAN. The eNB shall reply with S1-AP UE Context Modification Response message. The eNodeB may optionally solicit a measurement report from the UE to determine the target GERAN/UTRAN cell to which the redirection procedure will be performed. This is followed by IRAT Cell Change Order or Radio Resource Control, RRC, Connection Release with redirection to Enhanced Data Rates for GSM Evolution, EDGE, Radio Access Network GERAN or UTRAN depending on the supported UE and network modes. A network mode implies how LTE network has been configured to perform CSFB procedure to underlying UTRAN or GERAN network. Depending on the mode, CSFB can be performed to either UTRAN or GERAN. The eNodeB sends an S1AP UE Context Release Request message to the MME. The MME releases the UE Context in the eNodeB as well as all eNodeB related information in the Serving Gateway, S-GW.

If the target RAT is GERAN and Dual Transfer Mode, DTM, is not supported, the UE starts the Suspend procedure with the Serving General Packet Radio Services support node, SGSN. If the S1-AP UE Context Release Request message indicates that the UE is not available for the PS service in the target cell the MME starts the preservation and suspension of non-Guaranteed Bit Rate, non-GBR, bearers and the deactivation of GBR bearers towards S-GW and P-GW(s). The MME stores in the UE context that UE is in suspended status. The UE changes Radio Access Technology, RAT, followed by Location Area, LA, Update or combined Routing Area, RA/LA Update or LAU and RAU. The UE continues with the mobile originated call setup procedure with sending CMService Request.

Figure 9:
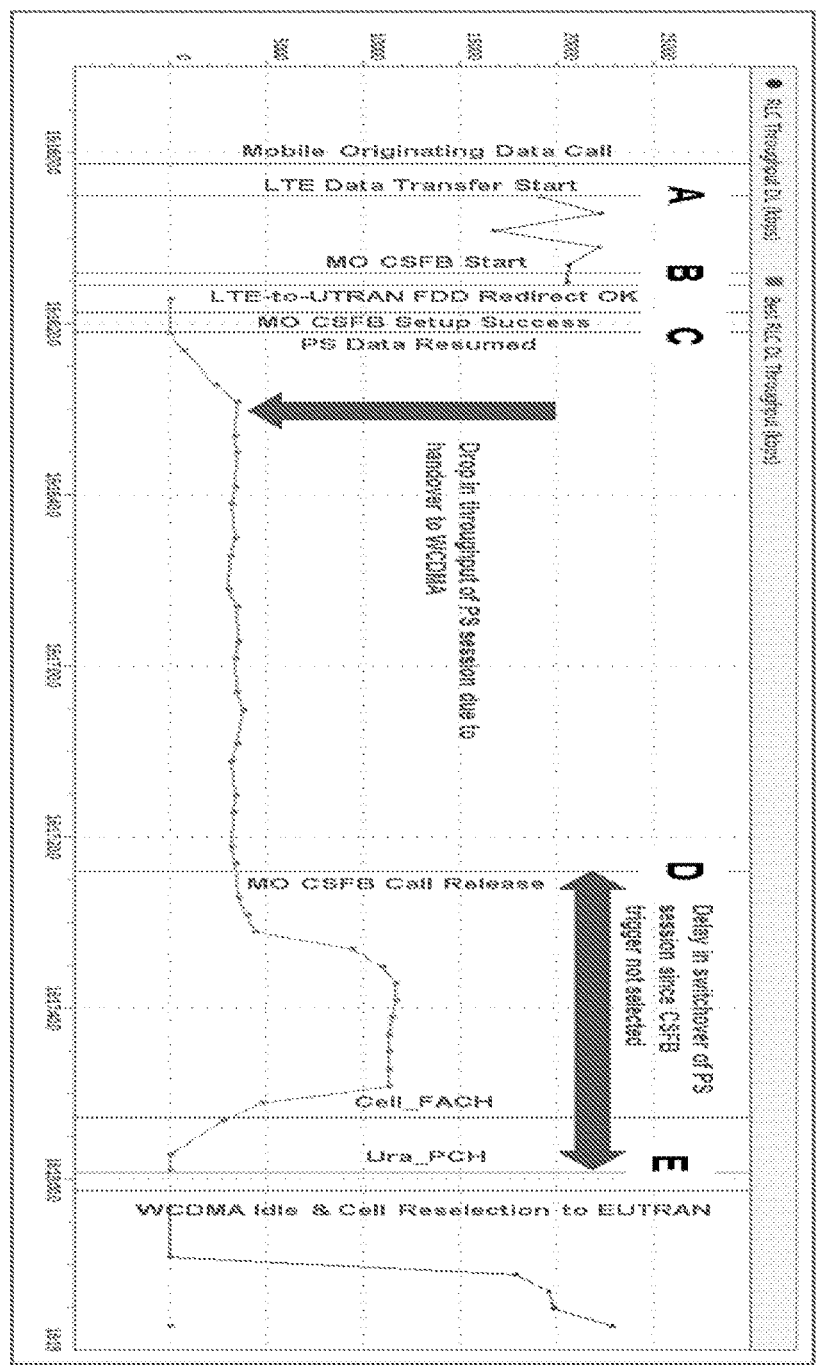
FIG. 9 is a diagram illustrating an exemplifying throughput pattern on UTRAN and E-UTRAN.

FIG. 9 is a time chart illustrating a UE first being served by E-UTRAN having a PS session ongoing, when a CS call is established wherein the UE is handed over to UTRAN by means of a Circuit Switched Fall Back, CSFB, feature.

The dotted line between A and B in the beginning represents the Long Term Evolution, LTE, RLC DL (E-UTRAN) throughput and the dotted line between B-C and E represents the Wideband Code Division Multiple Access, WCDMA, RLC DL throughput (UTRAN), both expressed in kbps.

Step A: Mobile originates a data call, i.e. PS session, and data transfer has started with average throughput of around 20 Mbps. Step B: During the data call at this step the LTE UE decides to make a voice call, i.e. CS call. The voice call is transferred to UTRAN/WCDMA network using CSFB feature. Step C: The voice call has been successfully transferred and since the data session was running on LTE, even the PS session is transferred. Notice there is degradation in throughput from about 20 Mbps to about 5 Mbps. Step D: The voice call has been ended by the user but the data call still continues on WCDMA with degraded throughput performance. Step E: There was some inactivity observed during the packet session and hence the Packet call was released and the reselects to LTE and resumes the data session. Observe the improvement in throughput after moving into LTE.

Downlink throughput in WCDMA is generally a function of the available resources (like available power, channel elements, codes, uplink RTWP). A high number of users on WCDMA may potentially limit the user perceived throughput as the available resources are shared between users. In a typical deployment where there are a large number of CSFB calls with active PS sessions, the 3G resource utilisation will become higher. This may severely impact the per user downlink throughput. A redirection to LTE based on the evaluation of the current 3G load may not only improve the user throughput, it may also improve the 3G cell effective (and user perceived) throughput due to reduction of load on the 3G network. This situation becomes especially significant if the quantum of CSFB calls coming to 3G network is high.

Figure 10:
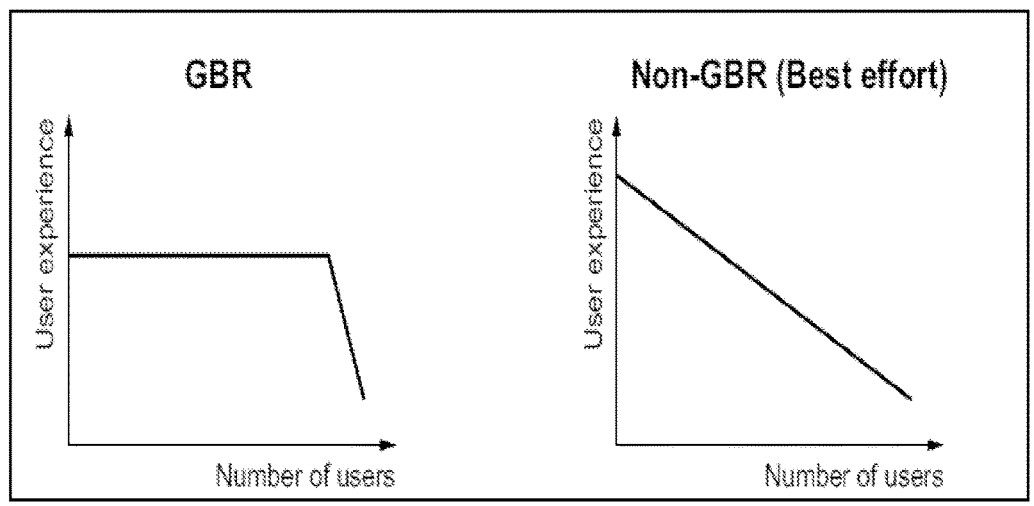
FIG. 10 is a diagram illustrating influence of number of users on user experience.

The loading of the E-UTRAN may be an important factor to consider before deciding to trigger back to E-UTRAN (LTE). This may be an important condition to consider if the correct quality of service, QoS, attributes are to be ensured for the given class of E-UTRAN-RAB to be established in E-UTRAN. The impact of loading on user experience is illustrated in FIG. 10. Class refers to the Evolved Packet Service Radio Access Bearer, ERAB, type for GBR or non-GBR services.

The influence of traffic load on user experience may be different for different type of services. The assessment of traffic load in the cell may be done using the existing Subscription Ratio model which is currently used for triggering Inter Frequency Load Balancing, IFLB, or load triggered Inter Radio Access Technology, IRAT, handover to WCDMA network. This cell load information may be exchanged between the LTE (E-UTRAN) and corresponding underlying 3G systems (UTRAN) which in turn may be used before triggering an Release With Redirect, RWR, to LTE. This may ensure that users who return to LTE network may enjoy proper QoS as per the service accessed. See also FIG. 10.

There may be several different triggers for RWR to LTE without taking the above described method and RNC into account, some examples are listed below:

1) Normal Release: When RNC receives RANAP Iu Release Command from the last CN connection, with a cause value counted as a "normal" release. This is the same situation as when a non-LTE capable UE is released to Idle. The cause values for the Iu Release Command counted as "normal" release are: a) Normal Release, b) Successful Relocation, c) Resource Optimisation Relocation, d) User inactivity, and e) No remaining RAB.

2) Fast Dormancy: When RNC receives RRC Signalling Connection Release Indication, SCRI, with cause value set to "UE Requested PS Data session end". This is the same situation as when a Fast Dormancy would be triggered for a non-LTE capable UE. Depending on the network configuration and available UE States, a UE can move to URA_PCH or Idle State upon triggering of Fast Dormancy.

3) FACH to URA: When RNC detects a period of inactivity in CELL_FACH, at the point in time when a non-LTE UE is switched to URA_PCH or Idle.

4) DCH to FACH: When RNC detects a period of inactivity in CELL_DCH, at the point in time when a non-LTE UE is switched to CELL_FACH.

5) csFallbackCsRelease: When RNC receives RANAP Iu Release Command from the CS core network, with a cause value counted as a "normal" release, for a UE which has done CS Fallback from LTE. The UE is immediately redirected back to LTE. Any active PS RAB is pre-empted.

6) csFallbackDchToFach: This trigger provides redirect of a CS Fallback UE when the speech call is completed and when any established PS RAB is inactive.

All these triggers 1-6 are static and take no consideration to e.g. pending data in RLC buffer(s) to be transmitted to the UE, to the current load of UTRAN or to the current load of E-UTRAN. Thus the method described above enables the RNC to also take into account varying conditions of the concerned UTRAN and E-UTRAN when determining to hand over the UE to E-UTRAN or to keep the UE in UTRAN.

The RLC buffer threshold may be settable using an operator configurable parameter, e.g. dlRlcBufRem. After the CS call release, if the data volume in the RLC buffer for downlink transmission to the UE is above the set threshold, the method flags it as a go-ahead criteria for preempting the PS RAB. This may be in conjunction with the setting of the parameter csFallbackCsRelease. It may be noted that if the pending data volume in DL RLC buffer is above threshold, the next step (i.e. UMTS/3G Load Evaluation) may be skipped and the RNC will proceed to check the current LTE load.

Figure 11:
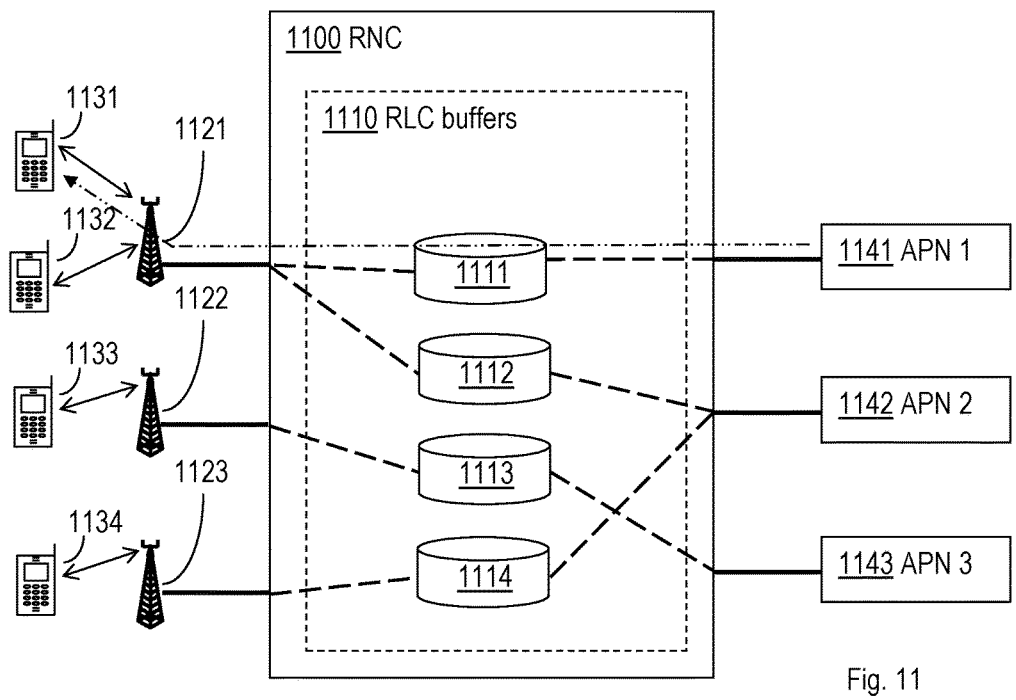
FIG. 11 is a block diagram illustrating an exemplifying RLC buffer implementation in an UTRAN network.

An example of an RLC buffer implementation is illustrated in FIG. 11.

In the RNC, the RAB is mapped to a radio bearer to be transmitted on the High Speed Downlink Shared Channel, HS-DSCH. The radio bearer is then processed by the RLC and Medium Access Control, MAC-d, layer 2 protocols in the RNC. The resulting MAC-d Protocol Data Units, PDUs, are transmitted over Iub to the Radio Base Station, RBS, using a HS-DSCH frame protocol.

The RLC protocol operates in a different way for HS-DSCH than for a Dedicated transport Channel, DCH. For the DCH the radio access retransmission protocol is implemented solely in the RNC's RLC protocol. With HS-DSCH, the MAC-hs/MAC-ehs protocol located in the RBS contains a hybrid automatic repeat request, HARQ, protocol with retransmission capability as well.

An RLC-related issue affecting a peak user throughput is the UE's buffer memory capability. The buffer memory is used by the RLC and MAC-hs/MAC-ehs entities to temporarily store PDUs while retransmissions are being performed. The larger the buffer memory, the larger the RLC window sizes in the UE can be configured by UTRAN, which in turn governs the maximum peak rate over layer 2 and, subsequently, end to end.

Typical RLC buffer information includes number of discarded Dedicated Control Channels DCCH, Service Data Units, SDUs, number of discarded Dedicated Traffic Channel, DTCH, number of retransmitted DCCH PDUs, number of retransmitted DTCH SDUs (ordered for each downlink logical channel for each DCCH and for each DTCH) associated with each UE.

In a next step, the current 3G load will be evaluated for the serving cell, i.e. RBS. As part of the evaluation process, the following metrics for the serving cell are evaluated: 1) Downlink Transmitted Carrier Power, 2) Downlink Channelization Code Usage, 3) Downlink CE Usage, 4) Number of High Speed Downlink Packet Data Access, HSDPA, Users, and 5) Uplink RTWP.

These metrics may be compared against the following user defineable thresholds, e.g.: 1) dlTxPwrThreshCsfbPsPreempt, 2) dlChCodeThreshCsfbPsPreempt, 3) dlCeThreshCsfbPsPreempt, 4) hsdpaUsersThreshCsfbPreempt, and 5) ulRtwpThreshCsfbPreempt.

The logical condition that may be evaluated could be as follows: 1) Downlink Transmitted Carrier Power>dlTxPwrThreshCsfbPsPreempt, 2) Downlink Channelization Code Usage>dlChCodeThreshCsfbPsPreempt, 3) Downlink CE Usage>dlCeThreshCsfbPsPreempt, 4) Number of HSDPA Users>hsdpaUsersThreshCsfbPreempt, or 5) Uplink RTWP>ulRtwpThreshCsfbPreempt.

Based on the outcome of the above condition, the next criteria may be evaluated, i.e. the current load of E-UTRAN/LTE. A SON-OM server may maintain a current record of all RBS, such as e.g. eNodeBs, toggled for LTE capacity. The assessment of traffic load in the cell may be done using the Subscription Ratio model which is currently used for triggering IFLB or Load triggered IRAT handover to WCDMA network. The RNC may access the current Subscription Ratio information of the corresponding LTE nodes (which will be the best possible candidates for reselection on LTE) before making a decision to redirect to LTE.

Figure 12:
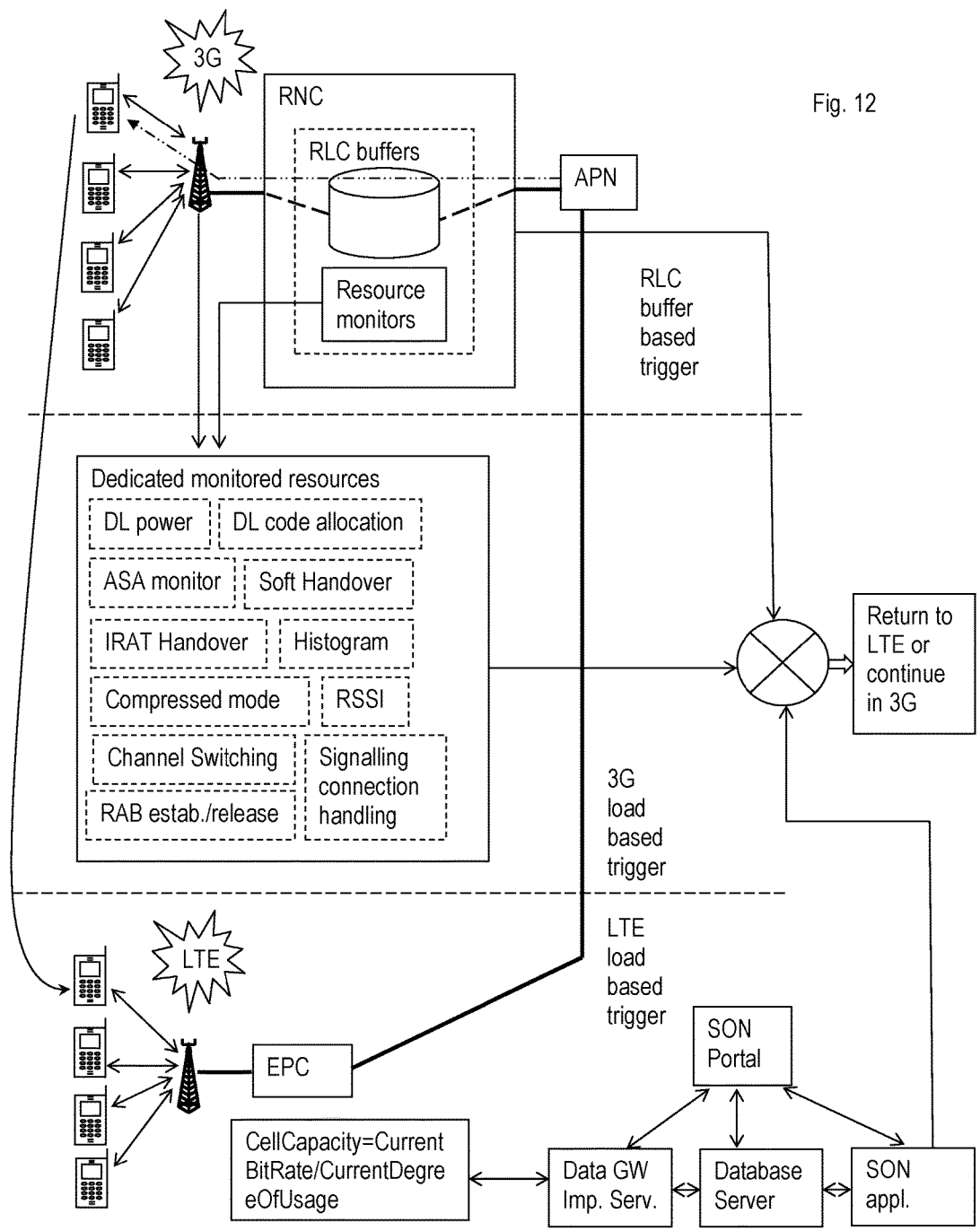
FIG. 12 is a simplified pictorial illustration of the method performed by the RNC in the form of a logical flow.

FIG. 12 is a simplified pictorial illustration of the method performed by the RNC in the form of a logical flow.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a Radio Network Controller (RNC) for handing over a User Equipment (UE) from a Universal Terrestrial Radio Access Network (UTRAN) to an Evolved UTRAN (E-UTRAN), wherein the UE has an ongoing Circuit Switched (CS) call and an ongoing Packet Switched (PS) session by means of the UTRAN, the method comprising, when the CS call is released:
 determining at least one criterion relating to at least one of an RNC characteristic, a UTRAN characteristic and an E-UTRAN characteristic, and
 handing over the UE to the E-UTRAN when the at least one criterion is fulfilled.

2. The method of claim 1, wherein the at least one criterion relates to the RNC characteristic, wherein the criterion is amount of pending Radio Link Control (RLC) buffer data within the RNC for downlink transmission, the pending RLC buffer data being associated with the UE.

3. The method of claim 2, wherein the amount of pending RLC buffer data is compared against a threshold, wherein the method comprises releasing a Radio Access Bearer (RAB) in the UTRAN and handing over the UE to the E-UTRAN-RAB if the amount of data pending in the RLC buffer arrangement is above the threshold.

4. The method of claim 1, wherein the at least one criterion relates to the UTRAN characteristic, wherein the criterion is a load level of the UTRAN.

5. The method of claim 4, wherein the load level of the UTRAN is determined by at least one of downlink transmitted carrier power, downlink channelization code usage, downlink Channel Element usage, number of High Speed Downlink Packet Access users, and uplink Received Total Wideband Power.

6. The method of claim 1, wherein the at least one criterion relates to the E-UTRAN characteristic, wherein the criterion is a load level of the E-UTRAN.

7. A Radio Network Controller (RNC) adapted for handing over a User Equipment (UE) from a Universal Terrestrial Radio Access Network (UTRAN) to an Evolved UTRAN (E-UTRAN), wherein the UE has an ongoing Circuit Switched (CS) call and an ongoing Packet Switched (PS) session by means of the UTRAN, the RNC comprising a processor and memory, the memory comprising instructions which when executed by the processor causes the RNC to, when the CS call is released:
 determine at least one criterion relating to at least one of an RNC characteristic, a UTRAN characteristic and an E-UTRAN characteristic, and to
 hand over the UE to the E-UTRAN when the at least one criterion is fulfilled.

8. The RNC of claim 7, wherein the at least one criterion relates to the RNC characteristic, wherein the criterion is amount of pending data in a Radio Link Control (RLC) buffer within the RNC for downlink transmission, the pending RLC buffer data being associated with the UE.

9. The RNC of claim 8, wherein the amount of data pending in the RLC buffer arrangement is compared against a threshold, wherein the memory further comprises instructions, which when executed by the processor causes the RNC to release a Radio Access Bearer (RAB) in the UTRAN and hand over the UE to the E-UTRAN-RAB if the amount of data pending in the RLC buffer arrangement is above the threshold.

10. The RNC of claim 7, wherein the at least one criterion relates to the UTRAN characteristic, wherein the criterion is a load level of the UTRAN.

11. The RNC of claim 10, wherein the load level of the UTRAN is determined by at least one of downlink transmitted carrier power, downlink channelization code usage, downlink Channel Element usage, number of High Speed Downlink Packet Access users, and uplink Received Total Wideband Power.

12. The RNC of claim 7, wherein the at least one criterion relates to the E-UTRAN characteristic, wherein the criterion is a load level of the E-UTRAN.

13. The RNC of claim 12, wherein the load level of the E-UTRAN is received from a Self-Optimizing Network-Optimization Manager (SON-OM).

14. The RNC of claim 7, wherein the memory further comprises instructions, which when executed by the processor causes the RNC to determine a criterion relating to an E-UTRAN characteristic and at least one criterion of an RNC characteristic and a UTRAN characteristic, wherein the E-UTRAN characteristic is a load level of the E-UTRAN, and to hand over the UE to the E-UTRAN when the load level of the E-UTRAN is below a threshold and the at least one criterion relating to the RNC characteristic and the UTRAN characteristic is fulfilled.

15. A Radio Network Controller (RNC) for handing over a User Equipment (UE) from a Universal Terrestrial Radio Access Network (UTRAN) to an Evolved UTRAN (E-UTRAN), wherein the UE has an ongoing Circuit Switched (CS) call and an ongoing Packet Switched (PS) session by means of the UTRAN, the RNC comprising:
    a determining unit for determining at least one criterion relating to at least one of an RNC characteristic, a UTRAN characteristic and an E-UTRAN characteristic, when the CS call is released, and
    a handover unit for handing over the UE to the E-UTRAN when the at least one criterion is fulfilled.

* * * * *